United States Patent [19]

Dale

[11] Patent Number: 5,415,135
[45] Date of Patent: May 16, 1995

[54] FOUR STROKE CONTINUOUS CYCLE RADIAL PISTON ENGINE

[76] Inventor: Thomas W. Dale, 157 Hughes Pl., Albertson, N.Y. 11507

[21] Appl. No.: 94,708

[22] Filed: Jul. 22, 1993

Related U.S. Application Data

[63] Continuation-in-part of Ser. No. 889,439, May 28, 1992, Pat. No. 5,257,599.

[51] Int. Cl.$^6$ .............................................. F02B 53/00
[52] U.S. Cl. .................................. 123/44 B; 123/235; 92/177; 92/182
[58] Field of Search ................ 123/44 B, 235; 92/182, 92/170.1, 177; 277/27

[56] References Cited

U.S. PATENT DOCUMENTS

| 3,298,331 | 1/1967 | Butler | 123/235 |
| 4,336,686 | 6/1982 | Porter | 123/44 B |
| 5,080,050 | 1/1992 | Dale | 123/44 B |

FOREIGN PATENT DOCUMENTS

| 2626315 | 7/1989 | France | 123/44 B |
| 1146698 | 4/1963 | Germany | 123/44 B |
| 407426 | 10/1944 | Italy | 92/182 |
| 412745 | 2/1946 | Italy | 123/44 B |

Primary Examiner—Michael Koczo
Attorney, Agent, or Firm—Galgano & Burke

[57] ABSTRACT

An rotary internal combustion engine consisting of a rotatable cylinder made up of fuel charge and multiple working segments rotating in unison. The fuel charge and working segments each contain a plurality of radially arranged cylinders open at both ends and a spherical piston in and freely movable within each of the cylinders. A stationary cam surrounds the cylinder having cam surfaces to contact the spherical pistons within each of the cylinders causing each piston in its respective cylinder to reciprocate as the cylinder rotates. A stationary core is located within and enclosed by the rotatable cylinder for supplying and carrying away working fluid into and from the cylinders as well as igniting and delivering fuel charge to the working segments. An alternative embodiment consists of a sealing arrangement between the pistons and cylinders utilizing rings with pressure balancing to reduce friction.

9 Claims, 9 Drawing Sheets

FOUR STROKE CONTINUOUS CYCLE RADIAL PISTON ENGINE

BACKGROUND OF THE INVENTION

This application is a continuation-in-part of my patent application Ser. No. 07/889,439, filed on May 28, 1992, for an "External-Internal Rotary Combustion Engine" U.S. Pat. No. 5,257,599.

The present invention relates to a rotary piston internal combustion engine and more particularly to a four stroke rotary internal combustion engine with a continuous cycle to increase the effective use of time in the engine cycle.

In the above-mentioned patent application, a rotary engine is provided in which the various engine functions required in a four cycle engine are carried out continuously in separate parts of the engine rather than intermittently within a single cylinder with the result that engine operation is smoother, less subject to vibrational forces, and with greater efficiency due to the elimination of the need to provide time in the engine cycle for the acceleration and deceleration of engine parts and fuel and exhaust gas flow. Also, the overlapping of events in the cycle which contribute materially to inefficiency in engines presently in use are largely avoided.

In a preferred embodiment of the invention described in the preceding application, a rotatable cylinder is employed which is made up of three working segments rotating in unison, namely, the fuel charge, combustion, and working segments. The fuel charge and working segments each contain a plurality of radially arranged cylinders open at both ends and a spherical piston in and freely movable within each of the cylinders. A stationary cam surrounds the cylinders having cam surfaces to contact the spherical pistons within each of the cylinders causing each piston in its respective cylinder to reciprocate as the cylinder rotates.

A stationary core is located within and enclosed by the rotatable cylinder for supplying and carrying away working fluid into and from the cylinders. Combustion chambers are formed within the combustion segment which separates the fuel charge and working segments. The combustion chambers have provision to ignite the compressed fuel charge delivered from the fuel charge segment and transfer the burning fuel charge to adjacent cylinders in the working segment after a sufficient delay to permit combustion to continue until turbulence largely disappears which results in increased efficiency in the engine. A portion of the burning fuel charge from the combustion chambers is fed back after a delay sufficient to quench the combustion to mix with incoming fresh fuel air mixture to clear the combustion chambers in preparation for a fresh compressed fuel air charge. The combustion products expand to cause the spherical pistons within the working segment to rotate the shaft assembly connected to the rotatable cylinder delivering the output shaft power of the engine.

By separating within the engine the compression, burning, and expansion events of the cycle, the need to overlap any of these events is avoided with the result that greater efficiencies are attained.

It has been found that in the engine described and claimed in the above-mentioned patent application a significant amount of incompletely burned fuel remained in the combustion chambers with a resulting loss to efficiency.

SUMMARY OF THE INVENTION

In this invention, I modify the engine described in my earlier patent application identified above to eliminate virtually any loss of the expansion gases and increase the efficiency without materially sacrificing any of the advantages described.

In accordance with the principles of this invention, the rotatable segment containing the combustion chamber is eliminated thereby leaving only the fuel charge and working segments.

In a preferred embodiment of this invention, instead of the rotatable segment containing the combustion chamber, a second working segment is provided to increase the expansion ratio, and ignition and combustion under pressure are carried out in both of the working segments where expansion and generation of power take place.

An important feature of the present invention is the use of gas pressure within the cylinders to reduce substantially mechanical losses due to friction.

It is thus a principal object of this invention to provide a rotary internal combustion engine which can produce higher compression and expansion ratios.

Other objects and advantages will hereinafter become obvious from the following description of preferred embodiments of this invention.

BRIEF DESCRIPTION OF THE DRAWINGS

FIG. 3A is a section taken along 3A—3A of FIG. 3.

DESCRIPTION OF THE PREFERRED EMBODIMENTS

Figure 1:
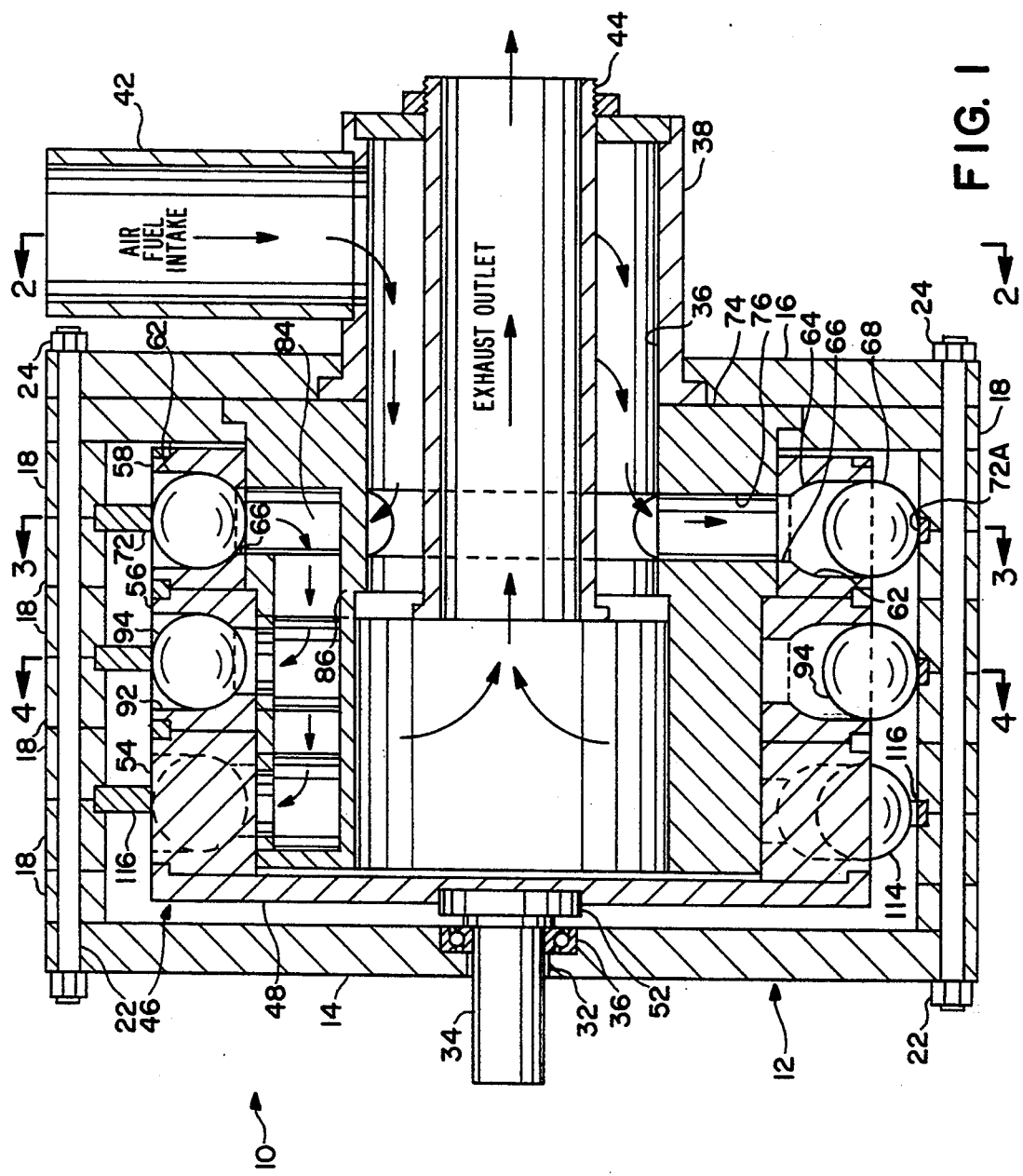
FIG. 1 is an elevation view in section of an internal combustion engine embodying the principles of this invention.
Figure 2:
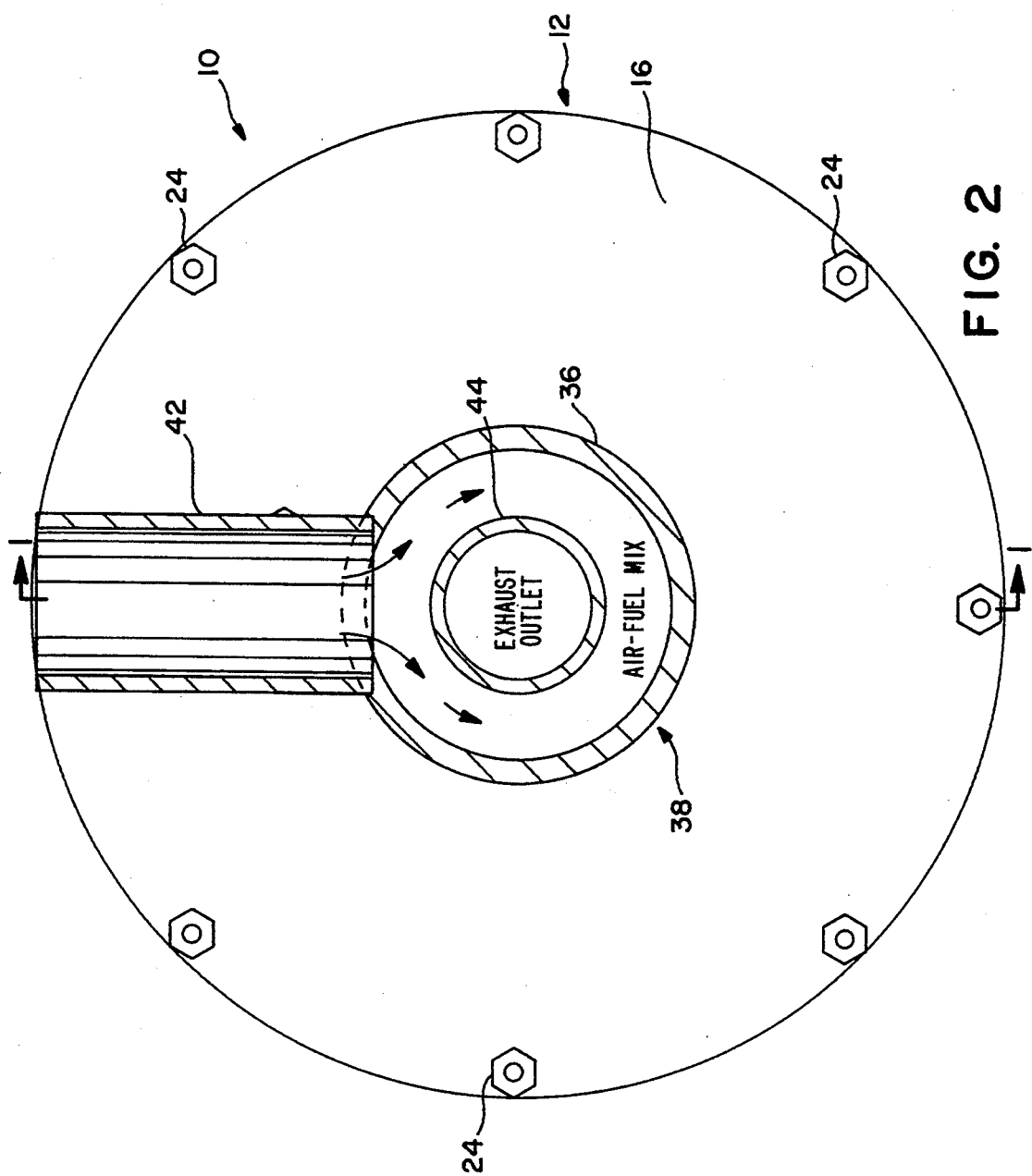
FIG. 2 is a section view partially schematic taken along 2—2 of FIG. 1.

Referring to FIGS. 1 and 2, internal combustion engine 10 comprises a housing 12 consisting of a pair of front and rear end plates 14 and 16, respectively, and a plurality of stacked housing rings 18 held together by elongated bolts 22 and nuts 24 forming the hollow interior illustrated.

Front end plate 14 is provided with a central opening 32 for passage therethrough of a power output shaft 34 which is supported on the outside of housing 12 by bearings 36 mounted in front end plate 14.

Rear end plate 16 is provided with an opening 37 formed by manifold assembly 38 which provides for the supply of fuel-air mixture through conduit 42 and the exhaust of combustion products by way of conduit 44. As seen by the arrows, fresh fuel-air mixture flows into the annular space between ducts 36 and 44 while the exhaust products of combustion flow out through duct 44 which will be more particularly described below.

Within housing 12 is a rotor assembly 46 comprising a circular plate 48 attached to output shaft 34 by a member 52 and segments 54, 56, and 58 all keyed together to rotate in unison. Segment 58 is the fuel charge segment, while segments 54 and 56 are power segments, to be described below.

Figure 3:
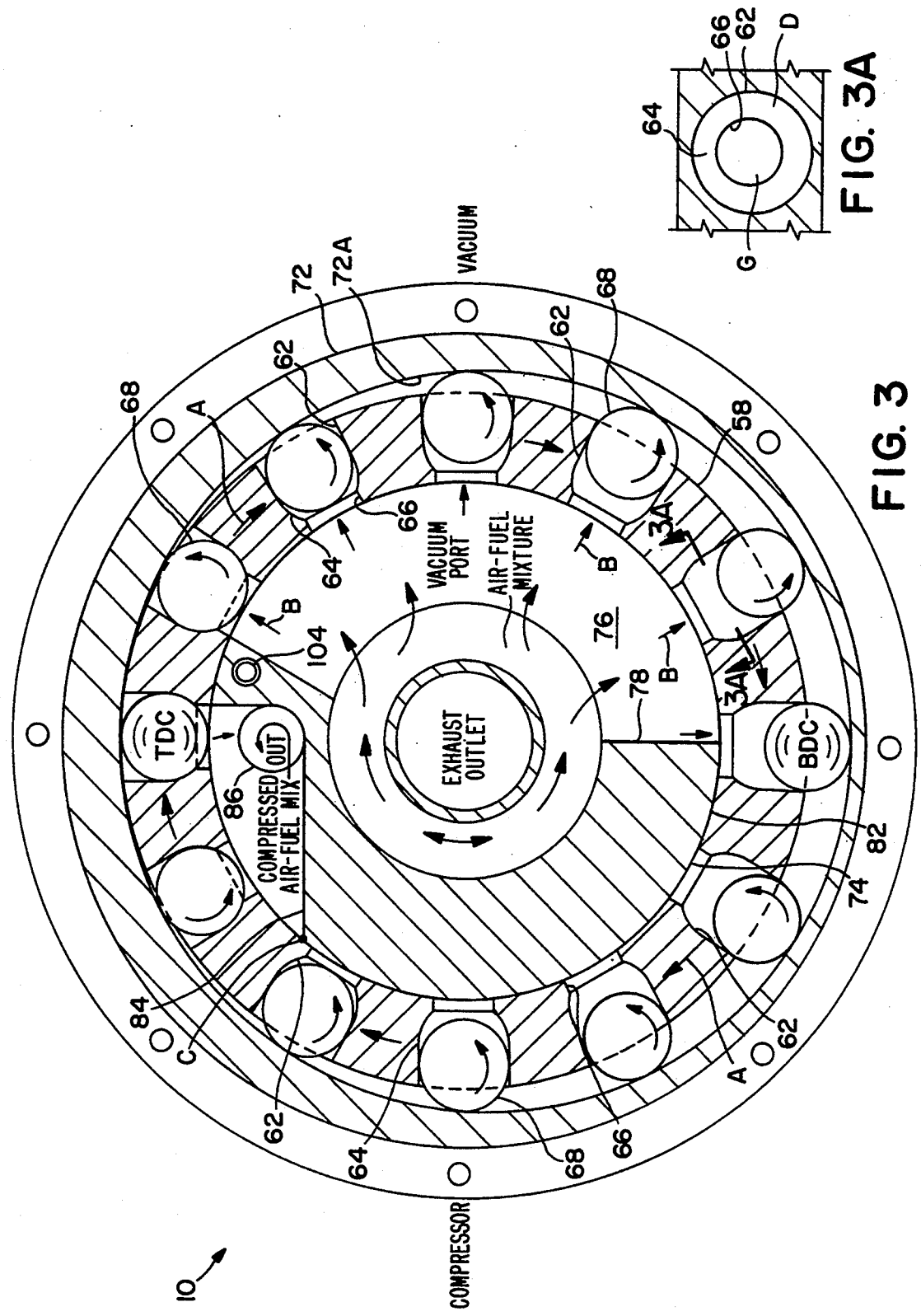
FIG. 3 is a section view partially schematic taken along 3—3 of FIG. 1.

Referring to FIG. 3 as well as FIG. 1, fuel charge segment 58 contains a plurality of radially arranged cylinders 62 circular in cross section which are open at both the inside and outside of segment 58. The radially inward end of each cylinder 62 forms a spherical seat or socket 64 with a passageway 66 penetrating the inner surface of segment 58. Within each cylinder 62 is a spherical piston 68 free to slide up and down, and rotate within, cylinder 62.

Radial movement of each piston 68 is controlled by a stationary cam 72 mounted in ring segments 18 of housing 12. Cam surface 72a of cam 72 contacting pistons 68 is circular but is off-center from rotor assembly 46 with the consequence that as rotor assembly 46 turns as shown by arrows A in FIG. 3, pistons 68 will reciprocate within cylinders 62 from the most inward position shown at the top, to the most outward as shown in the bottom of FIGS. 1 and 3. Pistons 68 are also able to rotate by rolling along cam surface 72a as assembly 46 rotates.

As seen in FIG. 3, a single rotation of rotor assembly 46 results in each piston 68 moving radially in and out just once.

As seen in FIGS. 1 and 3, stationary manifold assembly 38 includes an outer, annular wall 74 which closes off the inner ends of cylinders 62 except for ports and openings as will be described for providing access into cylinders 62.

Outer wall 74 of assembly 38 is provided with an annularly extending port 76 which extends from just past top dead center (TDC) to bottom dead center (BDC) so that as piston 68 moves outwardly as shown by arrows B for almost 180 degrees of rotation, fresh fuel-air mixture is being drawn into each cylinder 62. As each cylinder 62 moves past wall surface 78 ending port 76, each cylinder 62 is closed off by outer surface 82 of outer wall 74.

From BDC to point C on the outer surface 82 of outer wall 74, (see FIG. 3), pistons 68 are compressing the fuel-air mixture. After point C, the compressed air fuel mixture enters a groove 84 leading the mixture to a passageway 86 leading to both power segments 54 and 56 to be more particularly described.

Figure 4:
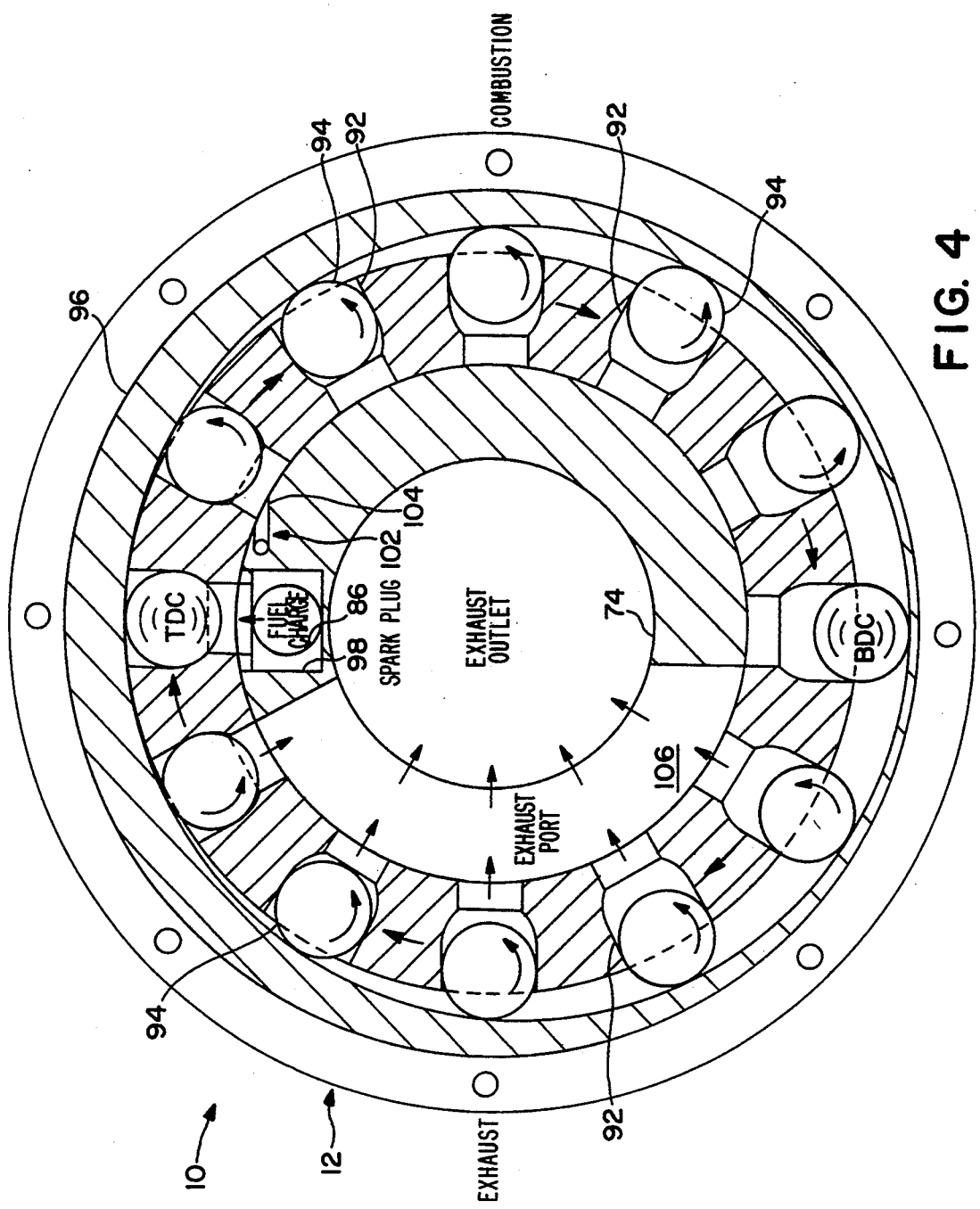
FIG. 4 is a section view partially schematic taken along 4—4 of FIG. 1.

Referring to FIGS. 1 and 4, power segment 56 is similar in construction to segment 58 in that this segment is provided with a plurality of axially extending cylinders 92 containing spherical pistons 94 free to reciprocate and rotate therein as previously described. Cylinders 92 and pistons 94 are similar in construction to those in segment 58, with a stationary cam 96 in contact with pistons 94 while outer wall 74 of manifold assembly 38 closes off the inner ends of cylinders 92 except during exhaust as will be described.

Passageway 86 is located as seen in FIGS. 1, 3 and 4 at about TDC where the compressed fuel air charge passes through groove 84, passageway 86 and port 98 into each cylinder 92 and is ignited by a spark plug 102 located at one end of a flame tube 104 leading to cylinder 92 a few degrees past TDC. As will be seen later, flame tube 104 interconnects both power segments 54 and 56. As will be seen from the discussion below, once the engine is running it will not be necessary to use spark ignition as combustion from previously fired combustion chambers will supply the ignition for the freshly charged chambers.

As the compressed fuel air mixture burns within each cylinder 92 in turn, piston 94 is driven outwardly against cam 96, rotor assembly 46 will be caused to rotate as indicated by arrows A to deliver the output of the engine to shaft 34.

After reaching BDC, cylinder 92 uncovers exhaust port 106 in outer wall 74 so that piston 94 being driven inwardly by cam 96 will force the exhaust products into exhaust outlet 44.

Power segment 54 is identical to power segment 56 except that it is offset by a small angle, typically lagging about 15 degrees from segment 56, in other words, out of phase with each other.

Figure 5:
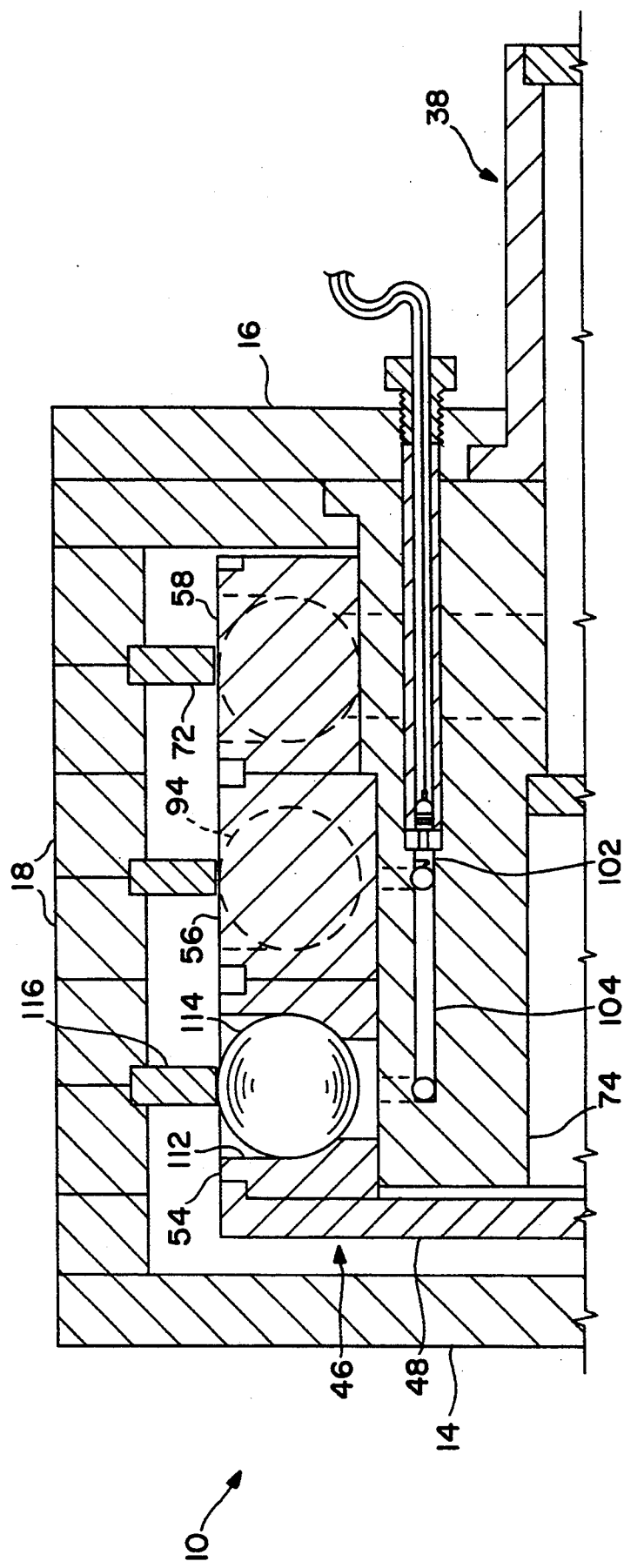
FIG. 5 is a section view partially schematic taken along 5—5 of FIG. 4.

As illustrated in FIG. 5, segment 54 comprises cylinders 112 containing spherical pistons 114 in contact with cam 116. Flame tube 104 extends axially in wall 74 and permits transfer of burning fuel-air charge between successive cylinders in adjacent working segments thereby obviating the need for spark ignition once the engine is running.

It is understood that conventional lubricating and cooling systems as required may be incorporated into the engine as described herein.

Figure 6:
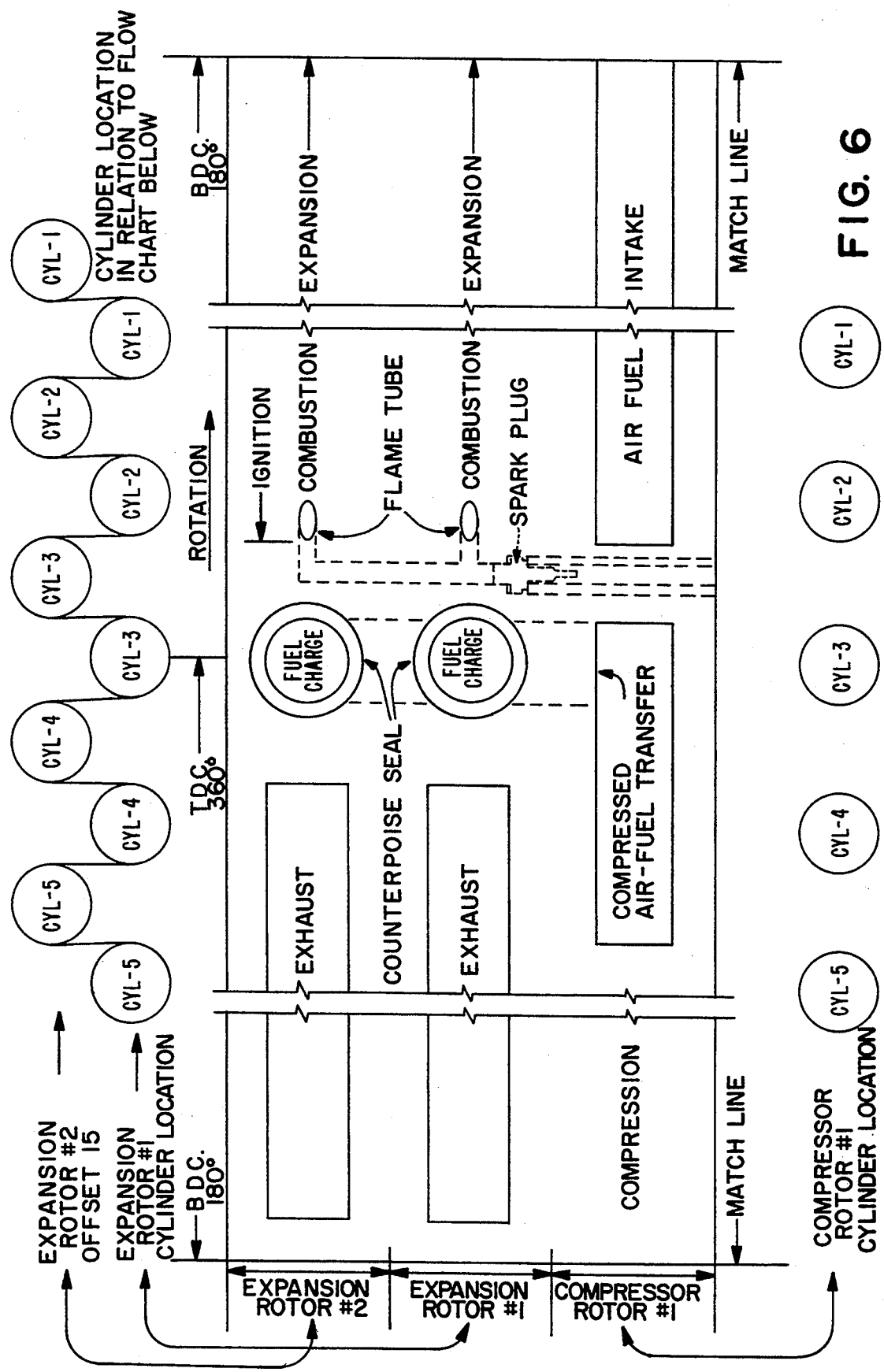
FIG. 6 is a diagram illustrating schematically the order of events occurring in the engine described in FIGS. 1 to 5.

In the operation of engine 10, as illustrated also in FIGS. 6, fresh fuel-air mixture is drawn into cylinders 62 of segment 58 between after TDC and BDC after which the mixture is compressed and fed by way of groove 84 and passageway 86 to both working segments 54 and 56 where the compressed fuel-air mixture ignites and expands. Fire tube 104 feeds ignition between the two segments so that in normal operation the use of spark plug is not required.

Pistons 94 and 114 are driven to expand under the pressure of the combustion products to drive rotor assembly 46 and produce the power output of engine 10 by way of shaft 34.

By separating out in engine 10 the compression and combustion and expansion steps, it is possible for all three to occur simultaneously without the problem of overlapping of functions which would force compromises resulting in inefficiencies. This produces greater efficiency and permits higher engine speeds to be reached without sacrificing any of this efficiency.

The engine embodying the principles of this invention eliminates or substantially reduces many of the problems found in conventional internal combustion engines. The mechanical efficiency of a modern engine runs about 90%, so that about 10% of the power developed within the engine is lost to friction.

In the embodiment of the present invention as described above, a substantial increase in mechanical efficiency is obtained. This engine basically has only two different moving parts, rotor assembly 46 which is made up of the fuel charge and working segments running in unison as a single part, and the spherical pistons. The rotor which is cylindrical in shape is subject to centrifugal force. As the rotor rotates, the centrifugal force acts to move it outwardly, away from the stationary core thereby reducing the amount of contact and hence the amount of friction developed.

In addition, it is seen from FIG. 3A that stationary manifold assembly 38 within area C exposed by passageway 66 is subject to gas pressure within cylinder 62 and that the annular effective area D surrounding passageway 66 is also subject to the same pressure. These areas are substantially identical to each other in the present invention (and in all cylinders). This has the effect of balancing the forces between assembly 38 and rotor assembly 46 contributing to the reduction of friction losses.

The spherical piston has a theoretical contact area of zero for each point of contact, either with the side walls of the cylinder or the cam surface. Along the latter, the piston is rolling with virtually no friction being developed. Within the cylinder, the dynamics of the movement of a sphere within a cylinder results in the continual displacement of the gasses present with the consequence that a high velocity gas cushion is developed between the sphere and the wall. Thus, direct physical contact between two solids is virtually replaced by a gas interface with the attendant well known reduction in friction forces.

By dividing the ignited compressed air-fuel mixture between two power segments it is possible to obtain a more complete expansion of the products of expansion with a resulting increase in efficiency.

A further reduction in the frictional forces developed between the spherical piston and the cylinder wall as well as improved sealing can be obtained by resort to the alternative embodiment shown in FIGS. 7A, 7B, 7C, 7D, and 7E.

Rotary internal combustion engine 210 is identical to the engine shown in FIGS. 1–5 except for the modification of each of the cylinders and the counterpoise sealing system utilized to accommodate each piston.

Figure 7A:
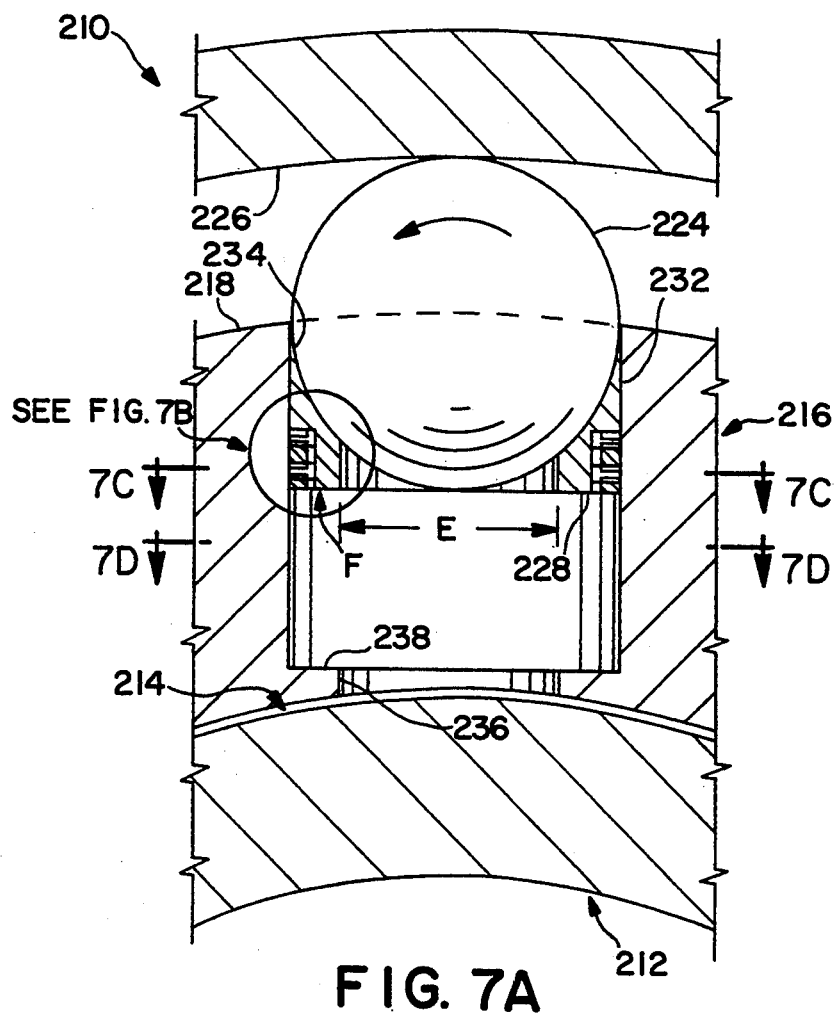
FIG. 7A is a cross section of a cylinder in a fuel charge segment which is an alternative embodiment of the construction shown in FIGS. 1-5.
Figure 7B:
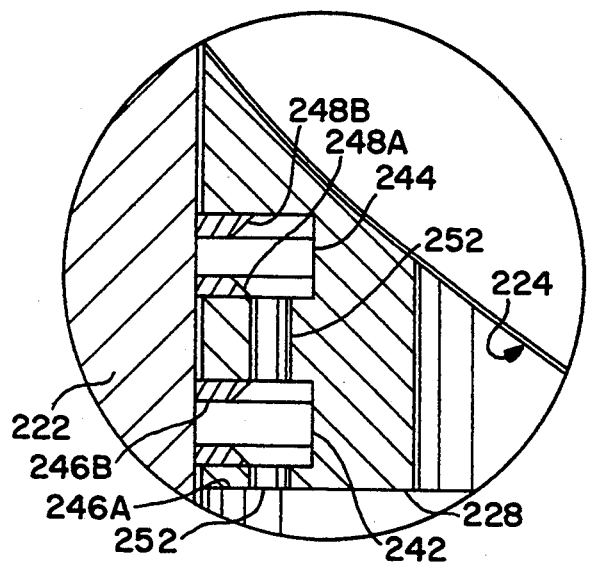
FIG. 7B is an enlarged detail of FIG. 7A.

Engine 210 is provided with a stationary manifold assembly 212 with a cylindrical outer wall 214 around which rotates rotor assembly 216 of which fuel charge segment 218 is illustrated. The working segments (not illustrated) would be identical in construction insofar as the piston-cylinder configuration is concerned as in the embodiment of FIGS. 1–5 previously described. In segment 218 are a plurality of cylinders 222 which are circular in cross section as seen in FIG. 7b.

Within cylinder 222 is a spherical piston 224 which rides on cam 226 in a manner described in connection with the embodiment shown in FIGS. 1–5. Instead of cylinder 222 being provided with a socket at its lower end to accommodate piston 224, cylinder 222 is provided with a counterpoise follower 228 which is ring-shaped having an outer cylindrical surface 232 matching the inner diameter of cylinder 222 so that counterpoise follower 228 is freely slidable within the former.

Counterpoise follower 228 has an interior surface 234 which forms a spherical seat or socket to accommodate piston 224 as is illustrated. The bottom of counterpoise follower 228 is squared off to match the bottom of cylinder 222 which is also squared off. Access to cylinder 222 is through a circular port 236 forming an annular shoulder 238 within cylinder 222.

Counterpoise follower 228 is provided with a sealing arrangement now to be described which provides superior sealing between the spherical piston 224 and its cylinder wall.

Referring to the detail shown in FIG. 7B, it will be seen that the outer wall of counterpoise follower 228 is provided with a pair of spaced annular grooves 242 and 244 which are rectangular in cross section and extend around the outer wall of counterpoise follower 228. Within each groove 242 and 244, respectively, is a pair of rings 246A and 246B, and 248A and 248B, which ride along their outer surfaces on the inner surface of cylinder 222.

Figure 7C:
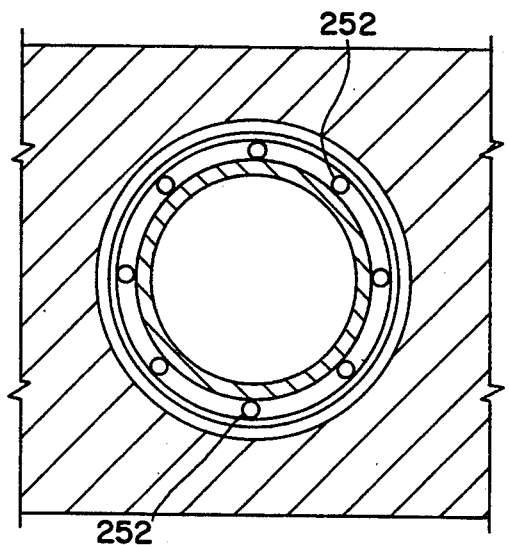
FIG. 7C is a section taken along 7C—7C of FIG. 7A.
Figure 7D:
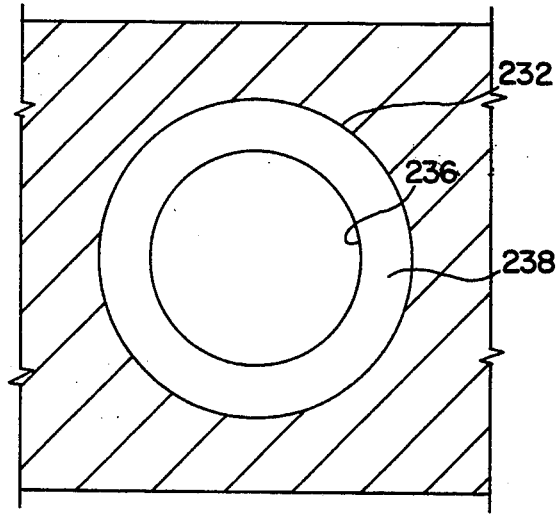
FIG. 7D is a section taken along 7D—7D of FIG. 7A.
Figure 7E:
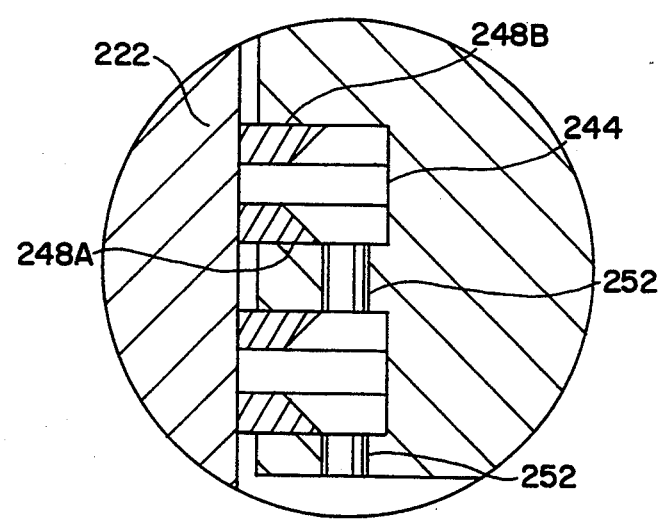
FIG. 7E is further enlargement of the detail shown in FIG. 7B.

Grooves 242 and 244 are subject to gas pressure under piston 224 by a plurality of annularly arranged ports 252 as seen also in FIG. 7C.

The cross sectional area of each pair of rings (ie, 246A and 246B) parallel to the surface of the cylinder wall where contact is made is substantially equal to the surface area of the wall exposed between the two rings. As a result of this arrangement, it is believed that there may be a reduction in the net significant force by the rings on the surface of the cylinder wall due to gas pressure.

The flow of gas due to the movement of counterpoise follower 228 along with piston 224 sets up a circulation of gasses so that there is a fluid seal in additional to any other sealing effect. Furthermore, area E which exposes piston 224 to gas pressure within cylinder 222 is substantially equal to annular area F which may be the area of counterpoise follower 228 exposed to the same pressure so that there is a balancing of forces which may reduce the amount of frictional contact between sphere 224 and counterpoise follower 228.

This arrangement reduces substantially, if not eliminates entirely, the need for lubrication of the cylinder wall depending on the materials employed.

The sealing arrangement just described is applicable for other uses including the conventional reciprocating internal combustion engine with cylindrical pistons.

Figure 8:
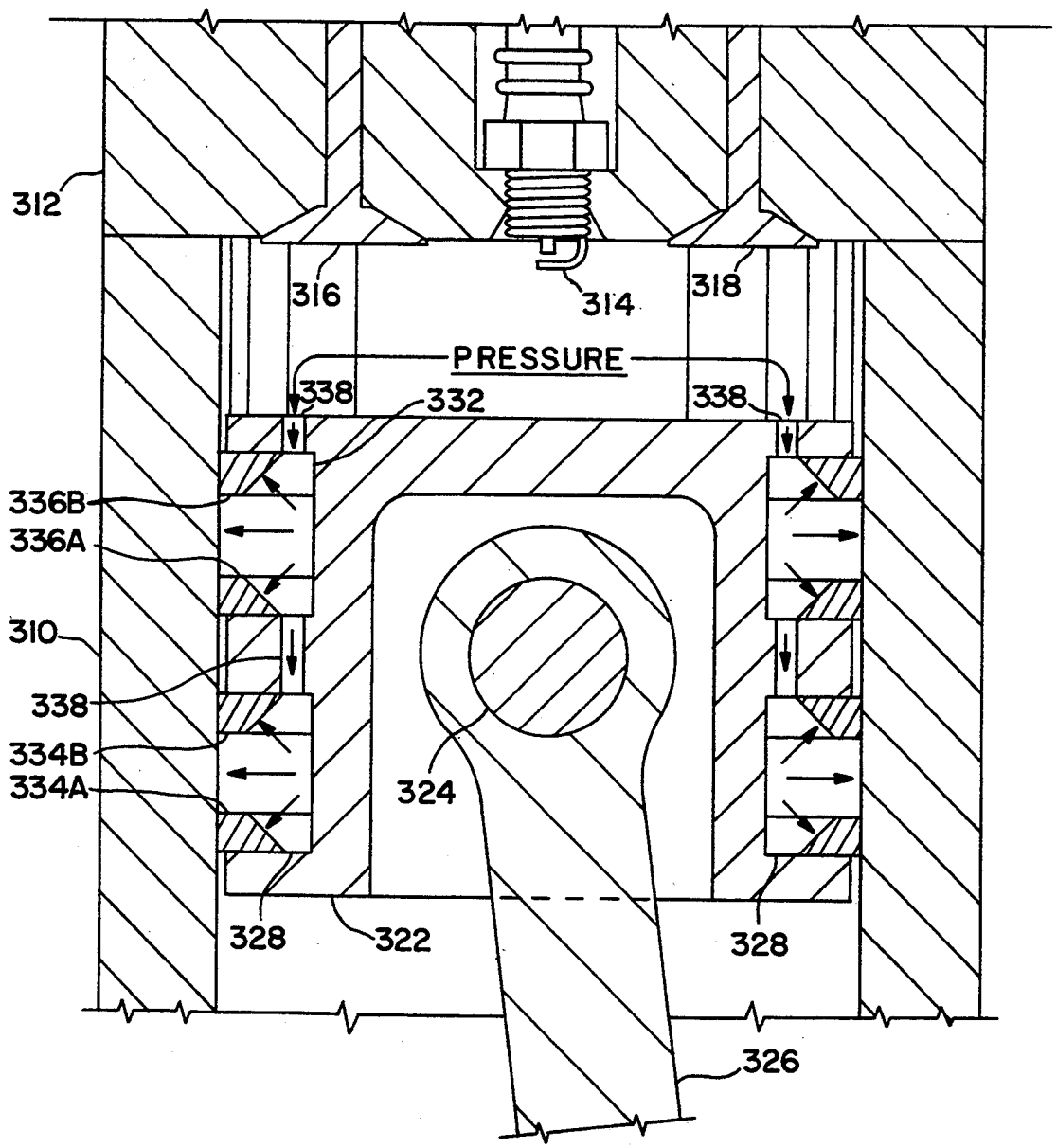
FIG. 8 is a section view through a cylinder in a conventional internal combustion engine.

Shown in FIG. 8 is a cylinder 310 with a head 312 containing a spark plug 314 and valves 316 and 318. Within cylinder 310 is a piston 322 of conventional cylindrical design connected by a wrist pin 324 and crank arm 326 to a crank shaft (not shown).

The circular outer surface of piston 322 is provided with a pair of spaced grooves 328 and 332 in which are located pairs of rings 334A and 334B, and 336A and 336B, respectively. A plurality of annularly arranged ports 338 provide communication between grooves 328 and 332 on the one hand and the enclosed space between the top of piston 322 and the closed end of cylinder 310. The effective cross sectional areas parallel to the surface of the cylinder of the two rings in each groove is exactly equal to the area exposed between each pair of rings so that there is no net force exerted by the rings on the inner surface of the cylinder due to gas pressure with the result that a fluid or gas seal is formed between the rings and the cylinder wall. This also will virtually eliminate wear on the rings and reduces, if not eliminates, the need for any lubrication of the cylinder wall depending on the materials employed.

It is thus been provided in one preferred embodiment a rotary internal combustion engine capable of increasing engine speed without the necessity to overlap various engine events and sacrifice efficiency. In another preferred embodiment of this invention is provided an improved sealing system between a piston and the walls of the cylinder.

While only certain preferred embodiments of this invention have been described it is understood that many variations are possible. For example, Other changes may also be made without departing from the principles of this invention as defined in the claims which follow.

What is claimed is:

1. A rotary internal combustion engine comprising:
   a. rotating means comprising fuel charge and working segments abutting each other and rotating in unison along their axes of rotation;
   b. said fuel charge and working segments each containing a plurality of cylinders containing a piston freely reciprocal within each of the aforesaid cylinders;
   c. stationary cam means having cam surfaces to communicate with said piston within each of said cylinders and causing each said piston in its respective cylinder to reciprocate as said rotating means rotates;
   d. stationary core means within and enclosed by said rotating means for supplying and carrying away working fluid to and from said cylinders;
   e. means in said stationary core means for delivering fuel-air charge to said cylinders in said fuel charge segment, the pistons in said cylinders in said fuel charge segment compressing said fuel-air charge, said stationary core means including means to deliver the compressed fuel-air charge directly to the working segment;
   f. passageway means in said stationary core means communicating with said working segment and containing means to ignite the compressed fuel-air charge in said working segment;
   g. said combustion products expanding in said working segment to cause said pistons within said working segment to work against said stationary cam means thereby causing said rotating means to rotate; and
   h. shaft means connected to said rotating means to deliver the output shaft power of said engine.

2. The rotary engine of claim 1 wherein said stationary core means includes an outer wall having grooves and passageways to provide communication between fuel charge and working segments.

3. The rotary engine of claim 2 wherein said cylinders are radially extended and open at both ends, each cylinder narrowing down to form a passageway communicating with a groove in said core means, the effective area on said core means exposed to gas pressure within each cylinder being substantially the same as the effective area in said cylinder surrounding said passageway.

4. The rotary engine of claim 1 in which said pistons in said fuel charge and working segments are spherical, unattached, and freely movable and rotatable within their respective cylinders.

5. The method of operating an internal combustion engine in which said engine comprises cylindrical means having fuel charge and multiple working segments rotating in unison, said segments being displaced from each other along the axis of rotation of said segments, said fuel charge and working segments each containing a plurality of radially arranged cylinders open at both ends, a spherical piston in and freely movable within each of the aforesaid cylinders, and stationary cam means surrounding said cylindrical means having cam surfaces to contact the pistons within each of said cylinders and causing each said piston in its respective cylinder to reciprocate as said cylindrical means rotates, and stationary core means located within and enclosed by said rotatable cylindrical means, the steps of said method comprising supplying a fresh fuel-air mixture to said fuel charge segment, compressing said fuel-air mixture in said fuel charge segment, transferring the compressed mixture through said stationary core means to the working segment, igniting said compressed mixture in said working segment through a passageway in said stationary core means, and expanding the combustion products in said working segment causing said pistons in said cylinders in said working segment to expand against the cam in contact therewith to cause rotation of said rotating cylindrical means to produce the shaft output of said engine.

6. The method as described in claim 5 in which said pistons are spherical and unattached within said cylinders.

7. A rotary internal combustion engine comprising:
   a. rotating means comprising fuel charge and working segments rotating in unison and displaced from each other along their axes of rotation;
   b. said fuel charge and working segments each containing a plurality of cylinders containing piston means freely reciprocal within each of the aforesaid cylinders;
   c. each said piston means comprising a freely, rotating spherical piston and a cylindrical follower having a spherical socket to accommodate said spherical piston, said follower including ring means for insuring sealing between the cylinder wall and said follower;
   d. stationary cam means having cam surfaces to communicate with said spherical piston within each of said cylinders and causing each said piston means in its respective cylinder to reciprocate as said rotating means rotates;
   e. stationary core means within and enclosed by said rotating means for supplying and carrying away working fluid to and from said cylinders;
   f. means in said stationary core means for delivering fuel-air charge to said cylinders in said fuel charge segment, the piston means in said cylinders in said fuel charge segment compressing said fuel-air charge, said stationary core means including means to deliver the compressed fuel-air charge to the working segment;
   g. means in said stationary core means to ignite the compressed fuel-air charge delivered from said fuel charge segment to said working segment;
   h. said combustion products expanding in said working segment to cause said piston means within said working segment to work against said stationary cam means thereby causing said rotating means to rotate; and
   i. shaft means connected to said rotating means to deliver the output shaft power of said engine.

8. The rotary engine of claim 7 wherein said stationary core means includes an outer wall having grooves and passageways to provide communication between adjacent fuel charge and working segments.

9. The rotary engine of claim 8 wherein said cylinders are radially extended and open at both ends, each cylinder narrowing down to form a passageway communicating with a groove in said core means.

* * * * *